(12) United States Patent
Wiemers

(10) Patent No.: US 8,758,604 B2
(45) Date of Patent: Jun. 24, 2014

(54) INTEGRATED VACUUM EVACUATION OF WASTE FOAM/GAS FROM AN ELECTROCOAGULATION UNIT DURING EFFLUENT TREATMENT

(75) Inventor: Reginald A. Wiemers, Littleton, CO (US)

(73) Assignee: Rockwater Resource, LLC, Denver, CO (US)

( * ) Notice: Subject to any disclaimer, the term of this patent is extended or adjusted under 35 U.S.C. 154(b) by 905 days.

(21) Appl. No.: 12/452,779

(22) PCT Filed: Jul. 31, 2008

(86) PCT No.: PCT/US2008/009250
§ 371 (c)(1),
(2), (4) Date: Jan. 22, 2010

(87) PCT Pub. No.: WO2009/017786
PCT Pub. Date: Feb. 5, 2009

(65) Prior Publication Data
US 2010/0116667 A1      May 13, 2010

Related U.S. Application Data

(63) Continuation of application No. 11/888,512, filed on Aug. 1, 2007, now abandoned.

(51) Int. Cl.
*B01D 19/02*      (2006.01)
*C02F 1/463*      (2006.01)

(52) U.S. Cl.
USPC ................. 210/120; 96/156; 96/176; 96/193; 96/194; 204/666; 210/188; 210/243; 210/538; 210/539

(58) Field of Classification Search
CPC ...... B01D 19/02; B01D 19/063; C02F 1/461; C02F 1/463; C02F 1/46104; C02F 1/46109; C02F 1/465
USPC ......... 210/188, 243, 258, 259, 261, 262, 299, 210/406, 702, 703, 748.01, 748.16, 210/512.1–540, 120, 538, 539; 96/151, 96/182, 183, 193, 194, 202, 204, 206, 217, 96/156, 176; 204/155, 157.15, 225, 204/228.1–230.8, 269, 270, 272, 450, 554, 204/600, 662, 666, 671; 205/687, 742, 743, 205/751, 755
See application file for complete search history.

(56) References Cited

U.S. PATENT DOCUMENTS

| | | | |
|---|---|---|---|
| 2,336,430 A | | 12/1943 | Wery |
| 2,635,753 A | * | 4/1953 | McLean ........................ 209/466 |
| 3,006,435 A | | 10/1961 | Alton et al. |
| 3,524,213 A | * | 8/1970 | Spivack .......................... 15/354 |
| 3,769,207 A | * | 10/1973 | Baer ............................ 210/703 |
| 4,338,178 A | * | 7/1982 | Efimov et al. ................. 204/232 |
| 4,414,091 A | * | 11/1983 | Axenko et al. ................ 204/277 |
| 4,500,329 A | | 2/1985 | Campoli et al. |
| 4,861,352 A | | 8/1989 | Cheng |

(Continued)

*Primary Examiner* — Joseph Drodge
(74) *Attorney, Agent, or Firm* — Harold A. Burdick

(57) ABSTRACT

Apparatus and method are disclosed for integrated waste foam/gas evacuation from an electrocoagulation unit. The electrocoagulation unit has a primary electrocoagulation reaction chamber with processing electrodes maintained therein. A flotation chamber is integrated above the reaction chamber and a vacuum hood is affixed over the flotation chamber. A vacuum nozzle device is connectable with a vacuum source and received through the hood and in the flotation chamber, a height adjustable foam intake provided at one end of the nozzle.

18 Claims, 6 Drawing Sheets

(56) References Cited

U.S. PATENT DOCUMENTS

| | | | |
|---|---|---|---|
| 4,931,225 A | 6/1990 | Cheng | |
| 5,000,219 A * | 3/1991 | Taube et al. | 137/501 |
| 5,004,531 A * | 4/1991 | Tiernan | 204/273 |
| 5,403,475 A | 4/1995 | Allen | |
| 5,711,051 A * | 1/1998 | Roden | 15/321 |
| 5,741,426 A * | 4/1998 | McCabe et al. | 210/707 |
| 5,936,364 A * | 8/1999 | Ohsawa et al. | 318/432 |
| 6,193,893 B1 | 2/2001 | Mazzei et al. | |
| 6,256,833 B1 * | 7/2001 | Steinberg | 15/325 |
| 6,325,916 B1 | 12/2001 | Lambert et al. | |
| 6,358,398 B1 | 3/2002 | Halldorson et al. | |
| 6,488,835 B1 * | 12/2002 | Powell | 205/744 |
| 6,582,592 B2 * | 6/2003 | Arnaud | 210/96.1 |
| 6,613,217 B1 * | 9/2003 | Gilmore | 205/755 |
| 7,211,185 B2 * | 5/2007 | Powell | 204/673 |
| 7,258,800 B1 * | 8/2007 | Herbst | 210/703 |
| 2002/0020631 A1 * | 2/2002 | Gavrel et al. | 205/752 |
| 2003/0070919 A1 * | 4/2003 | Gilmore | 204/275.1 |
| 2005/0274606 A1 * | 12/2005 | Powell | 204/228.2 |
| 2007/0017874 A1 * | 1/2007 | Renaud et al. | 210/703 |
| 2011/0233144 A1 * | 9/2011 | McCabe | 210/748.16 |

* cited by examiner

INTEGRATED VACUUM EVACUATION OF WASTE FOAM/GAS FROM AN ELECTROCOAGULATION UNIT DURING EFFLUENT TREATMENT

RELATED APPLICATION

This Application is a continuation of U.S. patent application Ser. No. 11/888,512 filed Aug. 1, 2007 now abandoned by inventors including the inventors herein which application is pending on the filing date of this Application.

FIELD OF THE INVENTION

This invention relates to effluent treatment, and, more particularly, relates to integrated vacuum evacuation of foam/gas from an electrocoagulation unit.

BACKGROUND OF THE INVENTION

Most industrial and municipal processes require water treatment facilities to treat effluents returned to the environment. Such facilities typically represent a significant investment by the business/community, and the performance of the facility (or failure thereof) can seriously impact ongoing operations financially and in terms of operational continuity.

Moreover, not all effluent treatment requires the same technologies. Industrial effluents (such as is found at coal bed methane facilities or oil production sites, for example) all have different particulate, pollutant and/or biomass content inherent to both the industrial processes as well as the particular water and soil conditions found at the site. Municipal requirements would likewise vary depending on desired end-of-pipe quality and use (and again depending on the feed water present at the site).

Electrocoagulation processes and foam/gas control processes in wastewater treatment are known. However, apparatus for performing such processes have heretofore required extensive maintenance and investment to assure proper operations, and have required extensive floor space for their installation. Moreover, some heretofore known apparatus have often required extensive monitoring to avoid accidental overflows between apparatus and/or have been inefficiently designed affecting both overall operation of the apparatus and plant as well as apparatus longevity.

Therefore, improvement of such apparatus could still be utilized. Moreover, improved treatment technologies adapted to this and other uses can always be utilized given the criticality of provision and maintenance of clean water.

SUMMARY OF THE INVENTION

This invention provides apparatus and methods for integrated vacuum evacuation of waste foam/gas from an electrocoagulation unit during effluent treatment. The apparatus and methods reduce maintenance and plant investment costs and reduce plant installation space requirements. The apparatus is stable and durable, and requires more minimal monitoring to avoid accidental overflows and/or contamination.

The apparatus includes a primary electrocoagulation reaction chamber for maintaining processing electrodes therein and having in effluent inlet and outlet. An integrated flotation chamber is located above the reaction chamber, and a vacuum hood is affixed over the flotation chamber. A vacuum nozzle device is connectable with a vacuum source and is received through the hood and in the flotation chamber. The vacuum nozzle device includes a height adjustable foam intake and an output, the foam intake including a nozzle body and an adjustable shroud with at least a first foam intake port thereat. Adjustment of the shroud on the body controls height of the intake port.

The methods of this invention include the steps of positioning a vacuum nozzle having with a body and a height adjustable intake port at the primary chamber so that the nozzle body is below or partly below fluid level thereat, and adjusting height of the intake port on the nozzle body so that the intake port is located in the foam layer just above the fluid level. A vacuum is applied to the nozzle to remove foam and gas through the intake port.

It is therefore an object of this invention to provide apparatus and methods for integrated vacuum evacuation of waste foam/gas from an electrocoagulation unit during effluent treatment.

It is another object of this invention to provide apparatus and methods for integrated vacuum evacuation of waste foam/gas from an electrocoagulation unit during effluent treatment that reduce maintenance and plant investment costs and reduce plant installation space requirements.

It is another object of this invention to provide apparatus and methods for integrated vacuum evacuation of waste foam/gas from an electrocoagulation unit during effluent treatment that provide stable and durable operation while requiring less monitoring to avoid accidental overflows and/or contamination.

It is still another object of this invention to provide an integrated electrocoagulation and waste foam/gas evacuation apparatus for treatment of effluents including a primary electrocoagulation reaction chamber for maintaining electrodes therein and having in effluent inlet and outlet, an integrated flotation chamber above the reaction chamber, a vacuum hood affixed over the flotation chamber, and a vacuum nozzle device connectable with a vacuum source and received through the hood and in the flotation chamber and including a height adjustable foam intake and an output.

It is yet another object of this invention to provide a vacuum device for evacuation of waste foam/gas from a primary electrocoagulation reactor chamber of an effluent treatment electrocoagulation unit, the vacuum device having a vacuum hood affixed over a flotation area at the top of the primary electrocoagulation reactor chamber, and a vacuum nozzle device connectable with a vacuum source and received through the hood and in the flotation chamber, the vacuum nozzle device including a nozzle body having and an adjustable shroud with at least a first foam intake port thereat, adjustment of the shroud on the body controlling height of the intake port.

It is yet another object of this invention to provide a method for vacuum evacuation of waste foam/gas from an electrocoagulation unit primary chamber that includes the steps of positioning a vacuum nozzle having with a body and a height adjustable intake port at the primary chamber so that the nozzle body is below or partly below fluid level thereat, adjusting height of the intake port on the nozzle body so that the intake port is located in the foam layer just above the fluid level, and applying vacuum to the nozzle to remove foam and gas through the intake port.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
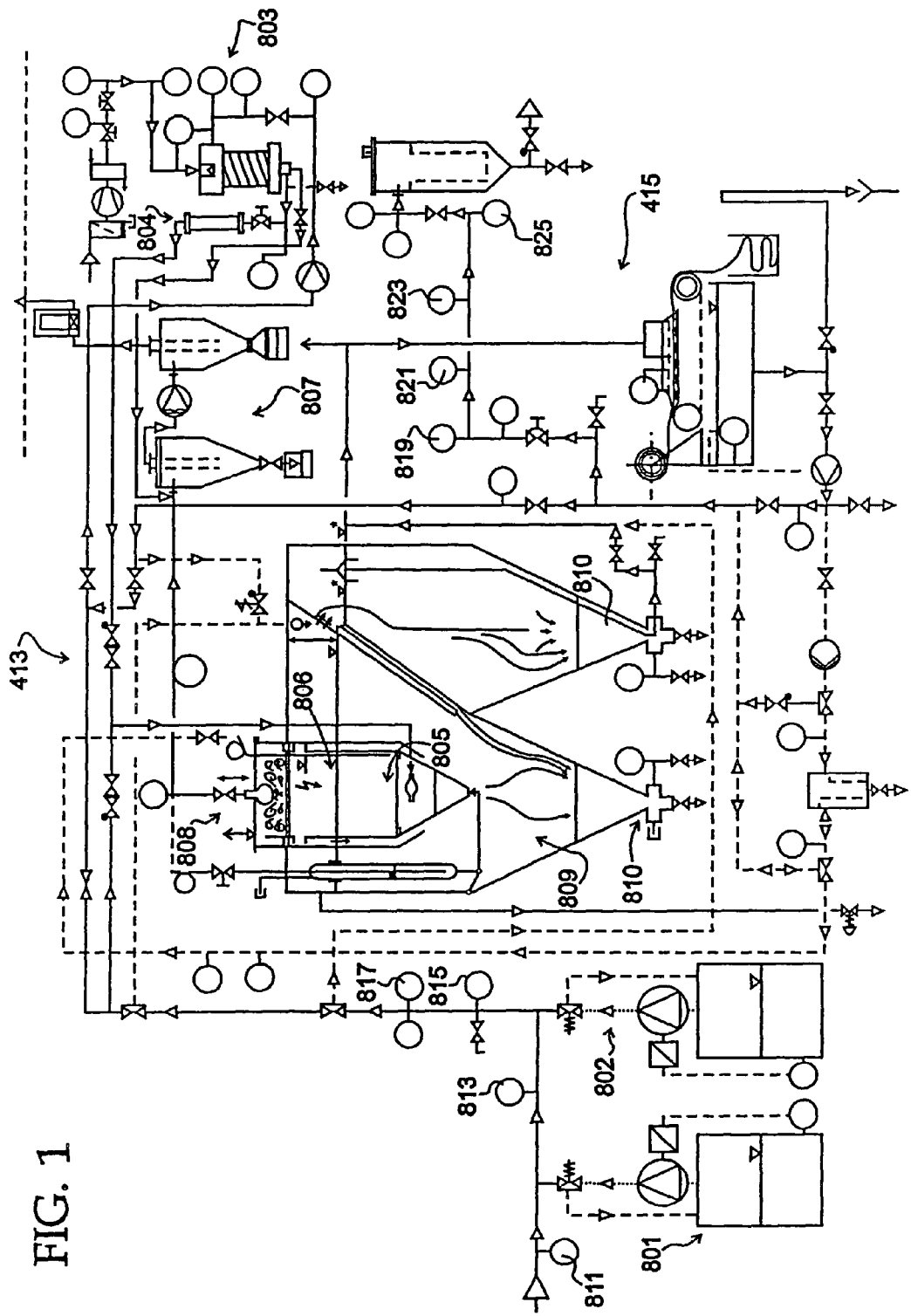
FIG. 1 is a diagram illustrating facilities for application of effluent treatment/sampling/testing processes.

FIG. 1 shows effluent treatment apparatus (in this case a pre-treatment suite) 413. These include pH and chemical dosing apparatus 801 and 802, respectively, ODE/IDI membrane aeration apparatus 803, electrocoagulation apparatus 805, dissolved air/gas flotation 806, vacuum introduced cyclone separation apparatus 807, vacuum degassing 808, lamella plate clarification 809 and sludge concentration output 810. Additionally, eight testing nodes 811 through 825 are shown.

The primary function of pre-treatment suite 413 is the removal or significant reduction (exceeding 90%) of colloidal matter with total suspended solids, such as polysaccharides or other slimy matter, less than about 75 nm. In addition, removal or significant reduction (by 80 to 90%) of fats, grease, oils and emulsions, and heavy metals (such as barium, strontium and others) by 60 to 99% is achievable. Finally, removal of entrained and produced gas by vacuum down to residual levels is achieved.

Regarding both ionized air/gas generation apparatus 804 and membrane aeration apparatus 803, improved ion treatment and reactor technologies, applications and methods of use are described. This aspect of the invention relates to effluent treatment utilizing ionized air or gas and membrane aeration, and has its objects, among others, enhanced ionized gas transfer through known membrane aeration technology providing energy efficiency over conventional venturi technology. Using this technology, ionized gas transfer into feed water is further enhanced by means of a static-in-line mixing comprising, for example, a progressive single coil system or an electrically charged dual coil system made from conductive but non-sacrificial material such as synthetic graphite.

As will be seen, an integrated coil mixing system is conveniently located between a portion of the outer membrane side and the inner reactor wall of the liquid side. A gas ionization chamber is an integrated part of the membrane support body. A radioactive energy source for gas ionization may be utilized, and is directly connected to the ionization chamber thus minimizing occurrences of recombination of ion pairs prior to their diffusive transfer into the liquid phase. Transparency of the reactor's housing and coil support body allows for visual inspection of the microbubble column and is controllable through means of associated valving conveniently located on a reactor mounting panel. The reactor's ionized air input is monitored and controlled by means of an in-line oxygen sensor and controller unit. The feed quality is monitored and controlled by means of conductivity meters at the incoming feed and the outgoing treated water lines.

In order to affect a reasonable fallout rate of contaminants in the water after electro-coagulation, it is necessary to add a chemical polymer prior to the electro-coagulation cell. If no chemical is added, fallout rates are unacceptably long. For a full size plant, this adds a burdensome financial component with respect to chemical costs and plant footprint. Slow fallout rates translate into large tanks for increased retention times.

Ionized air is a well recognized and employed technology in the field of air purification. By creating a large number of negatively charged oxygen ions and positively charged nitrogen ion, the ions then released into the air where they attach themselves to floating particulate matter of opposing charge, heavier particles are created through charge neutralization thus allowing them to fall to the ground effectively reducing airborne contaminants. The following teaches similar approaches at apparatus 803 and 804 of pre-treatment suite 413 for agglomerating, or coagulating, waterborne contaminants which are otherwise too small or incorrectly charged for easy removal.

Most waterborne contaminants in particulate form are charged. The charge can be positive or negative, although most particles in certain post industrial effluents (such as coal bed methane water) develop a negative charge. When the particulate matter freely floats in water, they are continuously being repelled by each other, this repelling action making the particles difficult to agglomerate to form a more easily removable mass.

By introducing a stream of negatively and positively charged ions into the water, one can effectively neutralize the particles specific charges thus allowing them to be brought into intimate contact to form more easily precipitated matter. Once the interparticle repulsive forces have been neutralized, the fallout rate in and after processing by electro-coagulation apparatus 805 will be enhanced and chemical treatment needs will be eliminated or drastically reduced. This process might also speed up and enhance the iron and manganese precipitation process as well. Finally, these ions are also very disinfective to harmful biologic components present in some feed waters presented for treatment and its holding tanks.

Membrane aeration apparatus 803 of pre-treatment suite 413 promotes radial mixing through means of an electrically charged Dualplex-start-Coil-System (DSC) mixing system. The DSC consists of two independent, non-touching coils with an even pitch spacing twisted around the membrane. The coils are situated in the space between the outside diameter of a membrane and the inside diameter of a support body. These coils are made of non-sacrificial, but conductive material, for instance graphite or graphite coated support material.

The proper non-touching spacing between the two coils is provided and secured through a thinwalled duplex-start grooved support body, made of clear nonconductive PVC. The duplex-starts in the support body are offset to each other (i.e., turned by 180°). Pitch of each coil and groove of one inch, providing a pitch distance of half an inch between the two independent coils, suggest good performance for most applications. The coils are screwed into the support body concurrently and the support body is inserted as a cartridge into a reactor glass body tube. The outer support body diameter is sealed against the body tube (using O-rings, for example).

AC power is connected to the coil to provide for electrical connection away from the liquid phase. In essence this embodiment operates similar to an electrocoagulation system with non-sacrificial electrodes, the electrically charged mixing coils representing the electrodes and the pitch spacing representing the electrode C—C distance. The operating current of the system is preferably 4 amps with a frequency converter setting of between 1 and 10 hertz.

This unit can be employed with photo (UV) or other means of initiation of air ionization. For example, if radioactive initiated air ionization is employed, the positively charged α-particles will deflect towards the negatively charged electrical field. The frequency controlled alternating deflection of the α-particles takes place primarily within the upper portion of the ionization chamber. This alternating deflection provides additional collision potentials with the continual incoming large number of neutral air molecules, thus slowing the recombination of positive and negative ion pairs prior to exposure to the contaminated effluent.

The alternating current flow provides an enhanced distribution environment for the diffusively aerated ionized air/gas for balancing the surface charge of particles in the feed water solution thus removing or reducing the electrical repulsive charge on the particles. This hydrodynamic mixing energy, provided through the differential pressure of the flow altering coil system, generates a turbulent fluid motion environment for interparticle contacts, sometimes called orthokinetik flocculation. The interparticle contacts of charge neutralized materials (for example, colloids) now destabilizes out of the dispersion, followed by collision of destabilized particles to form aggregates. The aggregation of these particles into larger more easily settled aggregates is necessary for efficiency enhancement of following processes where separation by precipitation, sedimentation and flotation takes place.

Figure 2:
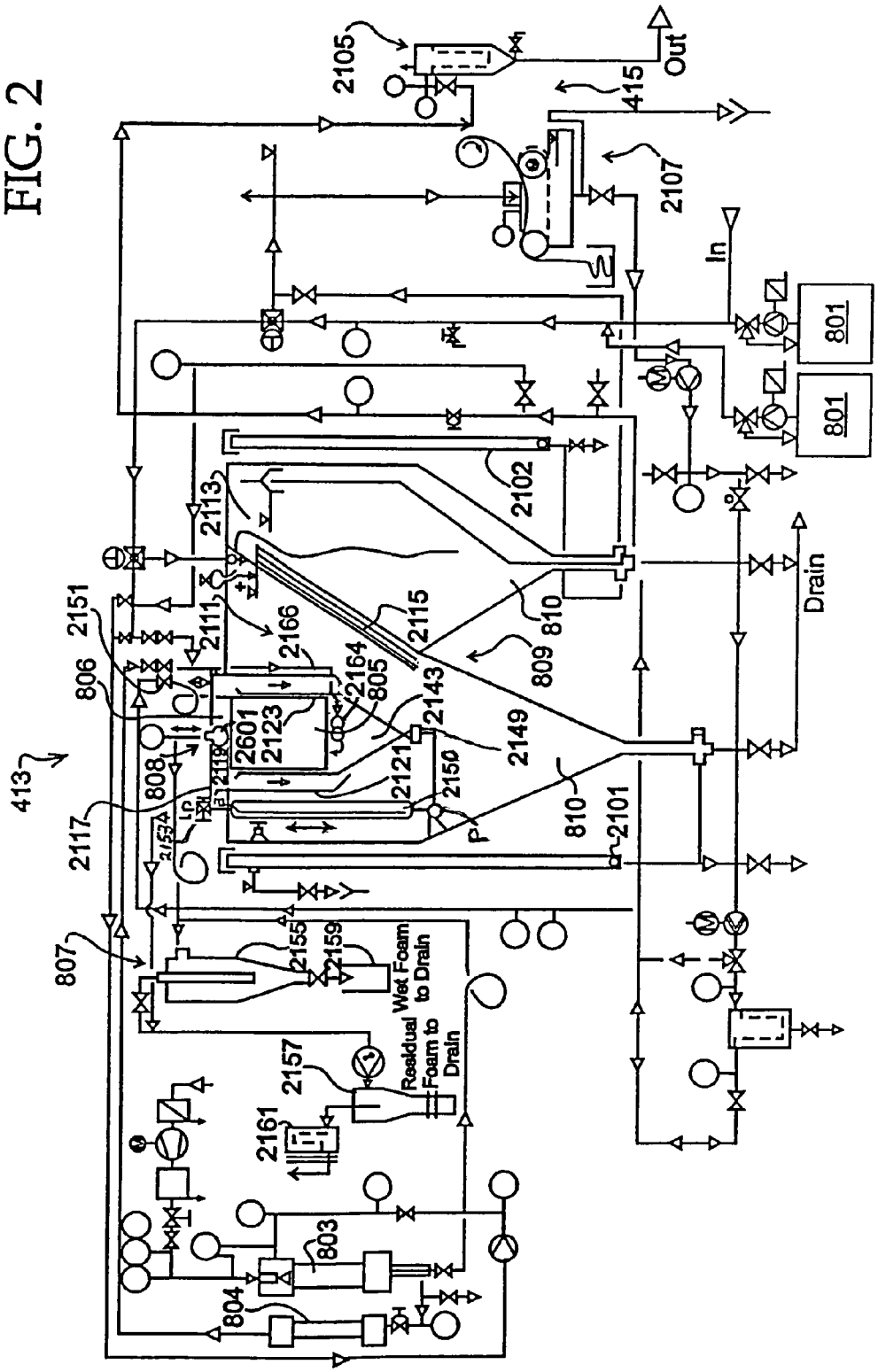
FIG. 2 is a diagram illustrating components utilized in a treatment suite including electrocoagulation apparatus.
Figure 3:
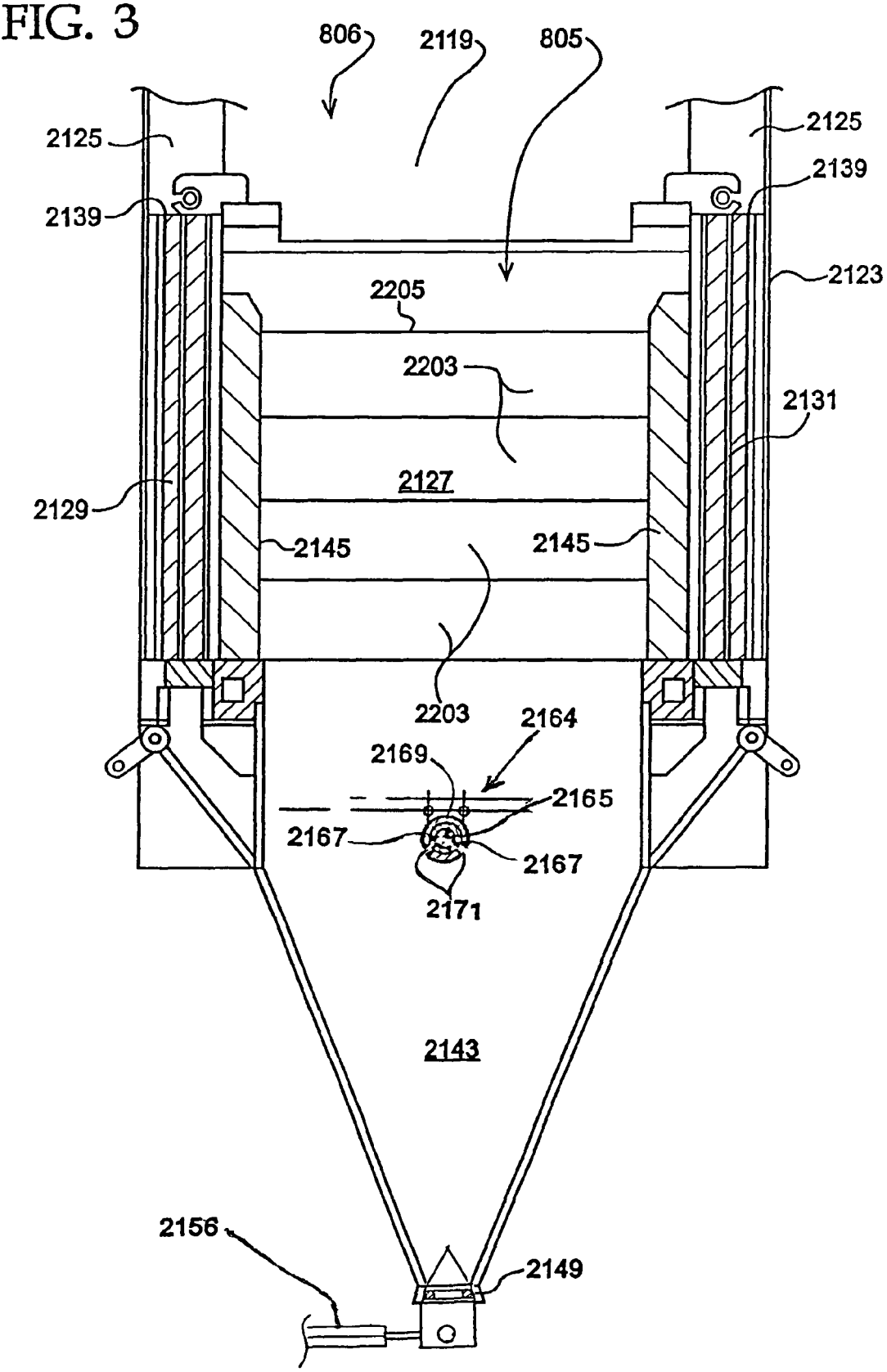
FIG. 3 is a sectional illustration of an electrocoagulation unit utilizable in the treatment suite.
Figure 4:
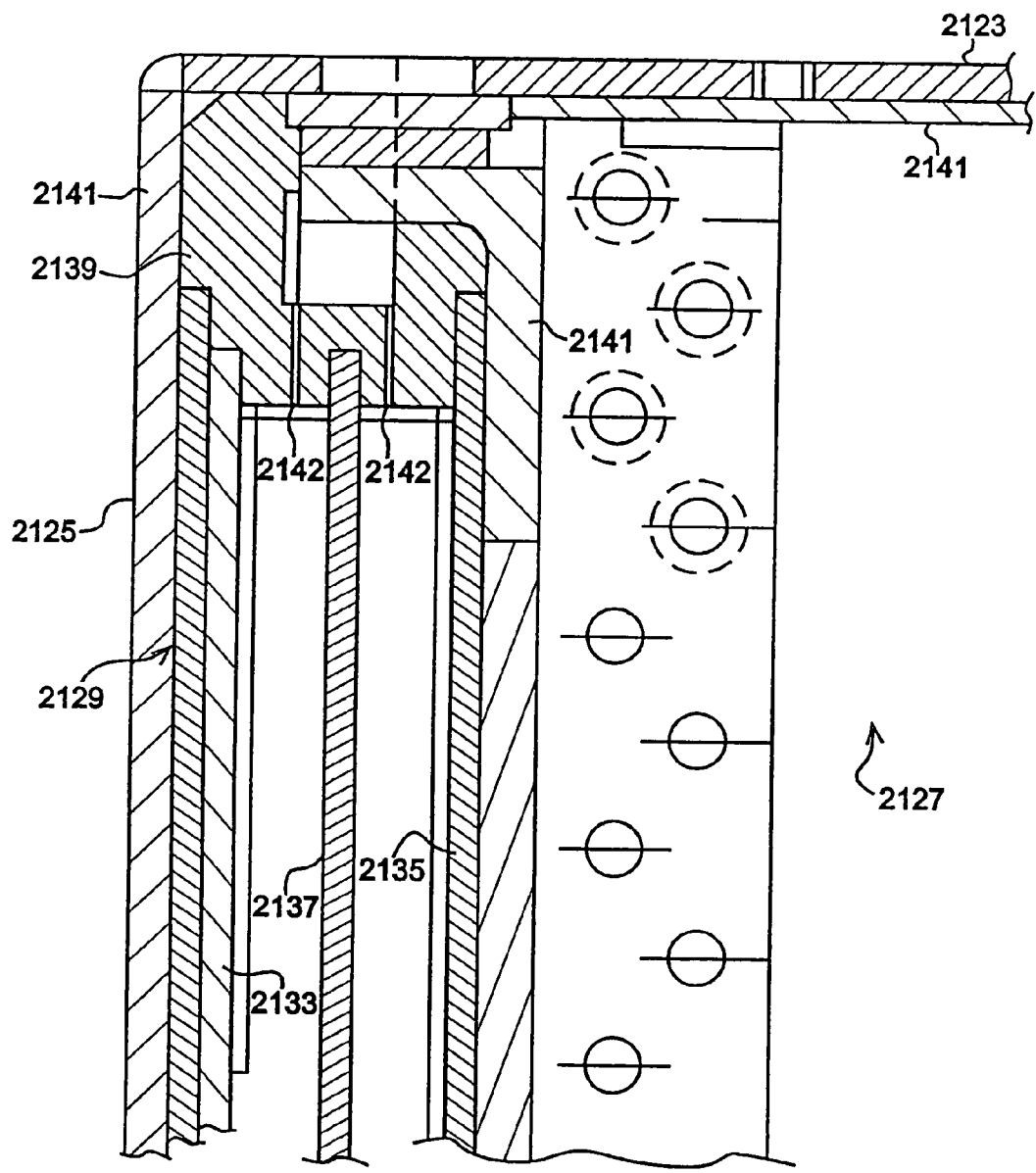
FIG. 4 is a partial sectional illustration of the housing of the unit of FIG. 3.

FIGS. 2 through 4 show various other apparatus of treatment suite 413, FIG. 2 illustrating a particular arrangement thereof including the ten apparatus 801 through 810 heretofore identified configured with selected piping, flow control and instrumentation configuration. IDI inline ionizer unit 804 may be any known alpha ionizer such as the STATICMASTER series form NRD and related instrumentation. Level sight glasses 2101 and 2102 allow convenient on-site process inspection. Output from suite 413 proceeds to stage 415 including a bag filter system 2105 and belt filter system 2107.

In accordance with this invention, FIGS. 2 through 4 and the following description illustrate the electrocoagulation apparatus and configuration in pre-treatment suite 413. Electrocoagulation apparatus 805 operates conventionally but includes a number of unconventional features. In addition, apparatus 805 is positioned in tank 2111 (the larger of the two tanks 2111 and 2113 separated by separator plate 2115) of lamella plate clarifier apparatus 809. Electrocoagulation operates by the splitting off of ions from sacrificial electrodes, or utilization of non-sacrificial electrodes with native or added ions, in apparatus 805. The ions are thus introduced into the water presented for treatment to destabilize suspended, emulsified or dissolved contaminants in the water by introduction of an electrical current. The water acts as an electric conductor in which current is carried, thus forming a hydroxide compound. The most common sacrificial electrodes utilized in such apparatus are made of iron or aluminum, the most common non-sacrificial electrodes being made of carbon.

Present electrocoagulation art does not adequately address the mechanisms of flotation, sedimentation and the circulation effect of coagulant aggregation in the early stages as bridging flocs. In the electrocoagulation process, the partially lighter aggregated coagulants are transported to the liquid surface by their attachment onto the ascending electrolytic gas bubbles. The remaining, predominantly heavier, aggregated coagulants bridge to heavier, larger flocs and precipitate out into a sediment layer.

Treatment analysis in advance of establishment of the treatment regimen determines the necessary mass quantity of matter that needs to be deposited by the sacrificial electrodes. For diagnostic real time capability, the electrocoagulation reactor described hereinafter may be equipped with selective multiple electrolytic cell choices (14 cells, for example) in the primary reactor chamber.

In accordance with this aspect of the invention, the following relates to electrical apparatus for electrolytic flotation and electrochemical dosing referred to as electrocoagulation, and apparatus, configurations and methods for treating contaminated waters for selective pre-treatment and/or cleaning of the waters. Electrocoagulation presents a cost-effective alternative to traditional methods for treatment of certain polluted waters or as a method for the pre-treatment of suspensions, emulsions and light sludges prior treatment with membrane technology, for instance clean up involving gas, dissolved and suspended solids removal from a hydraulic system where chemical or electrochemical dosing, coagulation, electroflotation, flocculation and sedimentation would be employed.

Apparatus 805 of this invention allows for a variety of electrode materials to be implemented within one active electrode plate area for numerous electrolytic treatment applications. The apparatus is compact and portable for easy delivery and hookup and is used in conjunction with the other apparatus for blending air, plasma-gas and/or dissolved metal salts with the feed water. As shown in FIG. 2, a plurality of pumps for controlling the feed water flow and a plurality of conveniently located valves, regulators and pump controls for automated or manual control of the various functions of the apparatus 805 are provided. Apparatus 805 is integrated directly with dissolved air flotation apparatus 806 in clarifier apparatus 809, and is further enhanced by integration with vacuum apparatus to accelerate the electroflotation of the floc-foam layer to the liquid surface of electrocoagulation reactor (together referred to herein as "electrolytic dissolved air flotation"—EDAF—treatment).

The EDAF treatment approach utilizes a modified plate electrocoagulation reactor design. Because electrocoagulation reactor 805 is an integrated part of clarifier tank 2111 of lamella apparatus 809, shear-free sludge transfer in a compact single unit structure is provided. Vacuum enhanced electroflotation is provided through the employment of an enclosed vacuum hood 2117 above flotation chamber 2119 of flotation apparatus 806, to speed up the flotation process and as well remove unwanted created or entrained gases via vacuum degassing apparatus 808.

Vacuum hood 2117 is adjustable for proximity and vacuum lift capability to optimize the electroflotation effect as well as floc-foam surface layer removal at cyclone separator apparatus 807. Hood 2117 is mounted on outer housing 2121 holding inner reactor assembly 2123 of electrocoagulation apparatus 805. Inner assembly 2123 (FIG. 3) is defined by four corner posts 2125 (FIG. 4) together establishing primary reaction chamber 2127 and secondary reaction chambers 2129 and 2131 adjacent the primary chamber. The secondary chambers provide additional electrocoagulation treatment stages to optimize the overall electrocoagulation treatment on an as needed basis. Each secondary chamber includes an anode, cathode and bipolar electrode 2133, 2135 and 2137, respectively, held in corner post 2139 for insulating the secondary chambers as well as forming supports for insulating walls 2141 of the primary chamber. A small jet of previously clarified process water received through conduits 2142 washes electrode 2137.

Conical integrated sludge chamber 2143 is formed below primary reaction chamber 2127 and vacuum/flotation chamber 2119 of flotation apparatus 806 is formed below chamber 2127. Primary electrode plates (either sacrificial or, preferably, non-sacrificial) are held at a plurality of electrode positioners 2145 at opposed chamber walls. This electrode framework allows rapid electrode interchangeability and/or electrode set ups specially adapted to site circumstances. For example, a composite electrode setup with electrodes of different materials combined within a single electrode stack could be utilized for treatment of complex feed waters. Bipolar electrodes 2137 of secondary chambers 2129 and 2131 are readily accessible for maintenance purposes.

Integrated sludge chamber 2143 provides buoyancy and/or electromechanically actuated sludge transfer via a sludge cone valve 2149. Sludge is transferred from sludge chamber 2143 into the fluid bed of the sludge holding/disposal, chamber 810 at lamella clarifier tank 2111 of clarifier apparatus 809, thus minimizing a shear introducing gradient to the delicate floc structure within the sedimentated electrocoagulation sludge. This eliminates or greatly reduces the need for expensive floc polymers and/or coagulants as well as reducing energy requirements for the floc rebuilding process. A compound sludge chamber angle of repose of 35° for hydroxide sludge is employed thus, in conjunction with a matching sludge cone release valve, preventing sludge build up within the chamber and expediting sludge release.

Float 2150 has a tap and valve arrangement 2153 at a suction line provided to allow weight adjustment by water addition to the float column or removal therefrom for trimming buoyancy of the float (wastewater removed is sent to cyclone unit 2155 to drain). Float 2150 is balanced across pivot (P) against valve 2149 to actuate the valve actuating arm 2156 and open the valve when the weight of solids content in chamber 2143 overcomes the buoyancy of float 2150. The resultant flush continues until head height equalizes and valve 2149 closes.

A variable discharge head and distribution system may be employed to minimize surface floc-foam layer carry over from the primary chamber and provide suitable discharge distribution geometry into secondary electrocoagulation chamber(s), thus minimizing channeling and ensuring effective electrocoagulation treatment in the secondary electrocoagulation. Secondary electrocoagulation flow control may be provided through discharge disks and dampener adjustment to ascertain proper flow distribution, retention time and minimize channeling, providing an effective secondary and efficient overall electrocoagulation treatment.

Multiple flat bar electrodes 2203 forming multiple electrode stacks 2205 (only one shown in FIG. 3) are employed. These standard vertical stacks consist of electrode bars 2203 arranged one on top of another. Horizontal stacks 2205 may be arranged with electrode bars 2203 in a side by side arrangement (instead on atop one another) and secured by a top contactor clip which also provides current transfer from one stack 2205 to the next. The vertical multi-flat bar stack 2205 arrangement is more suitable to maximize sacrificial electrode life. The sacrifice of electrode material is more pronounced on the leading edge/area of the ascending feed water flow in a downward or upward directed parabolic shape. The leading edge problem can be minimized by substituting the bottom bar with a nonmetallic, but conductive graphite bar. If unacceptable, a new sacrificial bottom bar needs to be added from time to time between whole stack replacements.

The vertical multi-flat bar option provides a mechanism for active electrode area reduction without sacrificing reactor retention time by insertion of dielectric/nonconductive plate area (PVC or CPVC) into the vertical stack electrode structure in place of active electrode bar(s). This allows varying of the active surface area to volume ratio to find the optimum ratio for a particular application. This variable ratio option is an important feature in establishing scale-up of this parameter.

Required electrical field strength (dependent upon concentration levels and contaminant types in the feed water) can be manipulated by varying electrode C—C spacing for treatment optimization. Primary electrocoagulation facilities at 2127 are powered with a variably applied amperage in the range of 0.1 to 60 amps. With electrode bars set in series connection mode, the same current flows through all the electrodes, and voltage is allowed to vary as electrocoagulation treatment progresses over time.

A crossflow electrode flushing capability option through valve 2151 is preferably provided to create a turbulent flow regime with the ascending water flow in primary electrocoagulation reactor chamber 2127 and with the descending flow within the secondary electrocoagulation reactor chambers 2129 and 2131. Flow direction of flush water jetting is staggered crosswise and perpendicular to the electrocoagulation process water flow over the electrode plates. The directed turbulent flow continually washes the sides of the electrodes and prevents or significantly retards the build-up of impermeable oxide layers (passive) on the cathode as well as deterioration of the anode due to oxidation. This can be done instead of polarity switching or, in a fine regulated mode, in addition to polarity switching in severe scaling situations or in applications that contain heavy amounts of grease or oils.

A small jet of previously clarified and pressurized process water flow is constantly or time sequentially introduced into the electrocoagulation process water flow through a plurality small ($1/32$", for example) holes drilled into electrode positioners 2145 at primary electrocoagulation reactor chamber 2127. Secondary electrocoagulation reactor chambers 2129 and 2131 have a plurality of similar holes 2142 drilled into spaces at insulating corner post 2139 between and close to the electrodes.

The three phase separation and removal areas of electrocoagulation reactor apparatus 805 operates as a standard parallel electrode unit (in a fluidized bed configuration a different arrangement would be applied). In phase one, light flotation solids in the floc-foam, gas ($H_2$ and $O_2$), and oil and grease layers are separated at the liquid surface and removed by the adjustable vacuum at vacuum chamber 2119. In phase two, the semi-clarified effluent of the primary electrocoagulation treated water is separated from underneath the floc-foam surface layer at chamber 2127 and is removed or transferred through adjustable disk head control devices into the secondary electrocoagulation reactor chambers 2129/2131. It is here either optionally treated or directly discharged into the settling portion of the lamella clarifier tank 2111 to develop clarity prior to discharge from the lamella separator 2115 overflow into the clear flow catch tank 2113. In phase three, the solids precipitate out into integrated primary electrocoagulation sludge chamber 2143, proceeding through the normal sedimentation process mechanics.

When operating electrocoagulation apparatus 805 with non-sacrificial electrodes, for instance with electrically conductive synthetic graphite electrodes, the necessary positively charged ions for maintaining the electrocoagulation process are partially provided by the feed water itself. The remaining part of the required positively charged ions are added in form of metallic ions such as Al+, Ca+, Fe+ and Mg+ salts. For an enhanced electron migration, the electrocoagulation process should be operated within the acidic range through chemical dosing with hydrochloric (HCl), sulfuric ($HS_2O_4$) or phosphoric acid ($H_3PO_4$). Utilization of synthetic graphite electrodes avoids the consumption, replacement and operating down-time associated with conventional sacrificial electrodes, and reduces energy and maintenance costs. Moreover, metallic salts are less expensive than the refined, finished, sawcut and otherwise machined or fabricated sacrificial metal electrode plates. Varying the voltage controls the rate of electrochemical activity.

To facilitate effluent feed into chamber 2127, feed controller assembly 2164 is provided (see FIGS. 2 and 3). A longitudinal tube 2165 of assembly 2164 is connected with effluent feed line 2166 and has plural elongated slots 2167 extending the length thereof (substantially the entire length of chamber 2127). Tube 2165 turns (for net feed area adjustment) inside stationary 1¼" base pipe 2169 having co-located elongated slots 2171 formed therealong. Turn adjustment of tube 2165 thus defines net opening slot area defined by the selected overlap or slots 2167 and 2171, and thereby distributes the whole feed through the entire length of primary electrocoagulation reactor chamber 2127 (thus avoiding channeling and other distribution problems).

Figure 5:
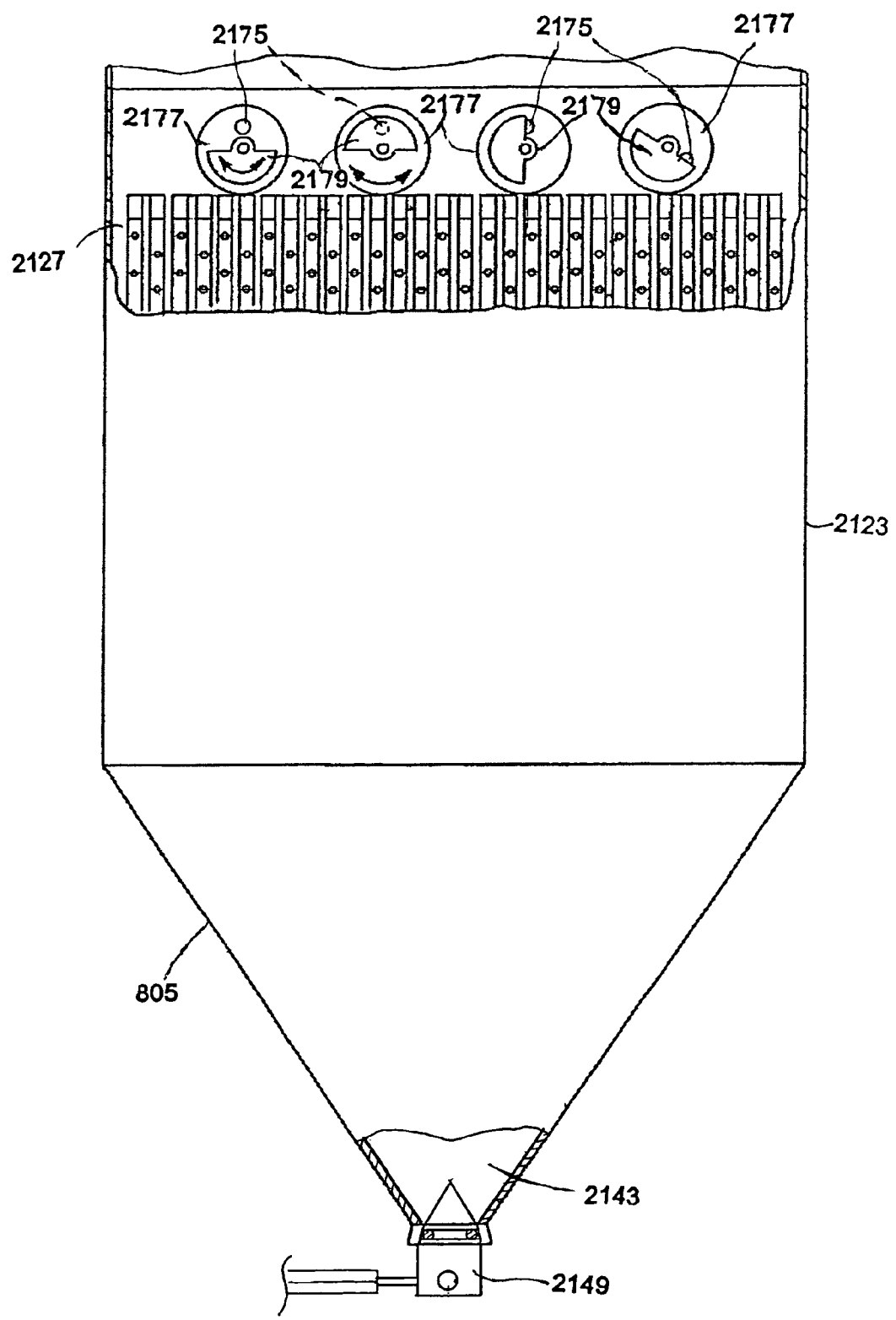
FIG. 5 is a partial sectional illustration showing apparatus providing primary fluid head height level and foam/gas level control in the electrocoagulation unit's primary reactor chamber.

To facilitate foam/gas level control and discharge from inner reactor assembly 2123, and control primary fluid head level height in the reactor assembly, apparatus 2173 is provided for primary fluid head height level and foam/gas level control in electrocoagulation unit 805' s primary reactor chamber 2127 as shown in FIG. 5. Selectively positionable orifices 2175 of discharge weir disks 2177 are provided for flow control from chamber 2127 or into secondary chambers 2129 and/or 2131. To prevent surface foam carry over into the discharge or secondary electrocoagulation treatment chambers, a positive fluid head above the center of these orifices needs to be maintained at all times.

Head height is controlled by rotation of primary disks 2177 to locate fluid transfer orifices 2175 at selected positions (heights). The head height in reactor chamber 2127 is higher than the surrounding fluid levels in the secondary chambers 2129 and 2131 and in the clarifier tank 2111. This higher level is instrumental in securing proper flushing of sedimented solids out of the sludge chamber during automated flushing cycles.

Variable foam level control is achieved by fine adjustment of the areas of orifices 2175 in disks 2177 utilizing rotatable covers 2179 pivotable mounted on disks 2177. Covers 2179 are utilized for selectively restricting flow through orifices 2175. In this way, fluid level height within primary chamber 2127 is controlled well above the transfer orifices' height, thereby avoiding transfer of foam on top of the chamber fluid through orifices 2175. Thus, foam and entrained oil, grease and other surface scum in primary chamber 2127 is retained in chamber 2127 for vacuum evacuation along with free gases as disclosed hereinafter.

Through simple contact plunger manipulation at an easily accessible multinode terminal bar or bars adjacent the electrodes (either manual or automated contact manipulation could be deployed), electrocoagulation reactor operating circuitry can be arranged for different modes of operation. For parallel operation, contact plungers are provided at each electrode node at a terminal bar. This arrangement of the electrocoagulation reactor circuitry provides parallel connection using monopolar electrodes. In this mode, the electric current is divided between all of the electrodes in relation to the resistance of the individual cells. The same voltage is present in all of the contact plungers. Varying the current controls the rate of electrochemical activity For series operation, one contact plunger remains active at the terminal bar furthest from the source power connections. Insulated jumpers connect the nodes. In this mode of operation the contactor terminal bar provides series connection for the monopolar electrodes in the electrocoagulation reactor. In series cell arrangements, a higher potential difference is required for a given current to flow, because of higher cumulative resistance. The same current would, however, flow through all the electrodes.

In a parallel, bipolar configuration (as shown in the secondary chambers 2129 and 2131, but which could be applied primarily), one contact plunger at both contactor terminal bars remains, the one furthest from the source power connections. Only the monopolar anode and cathode electrodes are connected to the electrical power connections. In this mode, bipolar electrodes with cells in parallel are used. The bipolar electrodes are placed between the two parallel anode/cathode electrodes without any electrical connections. When an electric current is passed through the two electrodes, the neutral sides of the conductive plate of the bipolar electrodes will be transformed to charged sides, which have opposite charge compared to the parallel side beside it. This cell arrangement provides, where applicable, a desirable testing platform for a full scale unit application. Its simple set-up and maintenance can lower the overall electrocoagulation operating cost.

A mixed parallel and series configuration could be provided, providing individual mixed cell circuitry configurations. For instance, in a fourteen cell reactor, half the cells could be connected in a series circuitry and the remaining seven cells connected in parallel, either as monopolar, bipolar or in mixed mode. This option can be used as a diagnostic tool when different amperages are needed for different electrode materials within the primary electrocoagulation reactor for specific treatment situations.

These parallel or series power connection choices are implemented by spring loaded contactor bars with integrated connection interchangeability (plungers). DC or AC operating power options with variable current density controls are implementable for control of electrochemical dosing and electrolytic bubble density production for sacrificial electrodes, as well as regulating the required transport current for the required added positively charged ions when nonmetallic and non-sacrificial electrodes are employed.

Controlled polarity switching for DC power implementations is provided to prevent or minimize oxide build up as well as hydrogen polarization. A vector frequency controller for the AC power option provides for frequency control below 60 Hertz to prevent disaggregation of agglomerated particles. To accommodate rapid changes of electrodes and/or customization of electrode setups, main power distribution through removable, quick release, swing away main contactor bars, providing as well for rapid change from parallel to series power connection, is utilized.

Regarding pre-treatment suite stages 411 and 413, zeta potential is an important part of the electrokinetic phenomena of interaction between particles in suspension. The zeta potential is the electrokinetic potential of a suspended particle as determined by its electrophoretic mobility. This electric potential causes colloidal particles to repel each other and stay in suspension. The zeta potential is a measurement of the overall charge characteristic of the suspended particles in the water. The kind and magnitude of the electrical charge depends on the surface potential of the particles, or the zeta potential. A negative zeta potential indicates that the water contains free negatively charged suspended solids (common in many treatment feed waters) that are stabilized and therefore more likely to stay in solution.

A neutral zeta potential indicates that the suspended solids do not carry a charge to assist in their electrical repulsion of each other. They are more likely to destabilize and coagulate into larger particulate groups and fall out of solution, and therefore being removed as part of the pre-treatment. The importance of the zeta potential rests on the fact that it can be measured experimentally and in many cases serves as a good approximation of the unmeasurable surface potential of the colloidal particle, since there is a fairly immobile layer of counter ions that sticks tightly to the surface of the particle. Treatment diagnostics herein thus uses the zeta potential measurement to gauge coagulant requirements (if any), and can be adapted for automated adjustment of an injected cationic (positively charged) coagulant such as reverse osmosis Quest 6000, which could be used in pre-treatment stage 411, to achieve a neutral zeta potential upstream of pre-treatment stage 413. Thus utilized, suspended solids would be more likely to fall out of solution into 2111 of clarifier 809.

Filtration stage 415 (step 7) makes use conventional know bag filter systems 2105 and or belt filtration systems 2107 (such as the Roll-A-Filter or Lazy Filter fabric media systems produced by SERFILCO.

Vacuum introduced cyclone separation apparatus 807 of suite 413 (FIG. 2) utilizes a conventional cyclone unit or units 2155 and 2157 connected for vacuum inducement apparatus 808 and hood 2117 and outlet for foam collection through filters 2159 and 2161, respectively.

Figure 6:
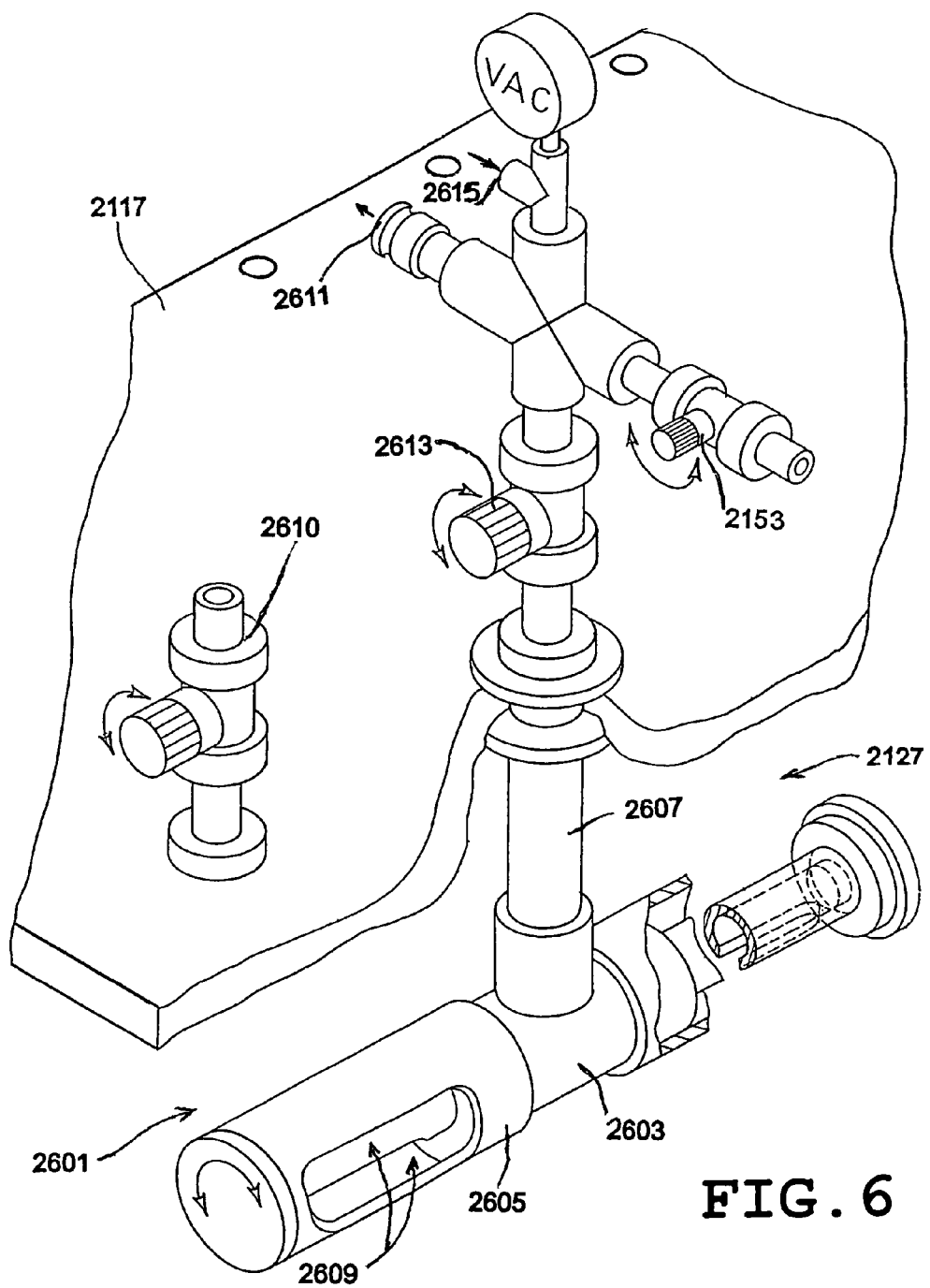
FIG. 6 is a perspective view showing portions of the hood and height adjustable vacuum nozzle device employed for evacuation of foam/gas in the reactor chamber of the electrocoagulation apparatus.

FIG. 6 illustrates the functions of vacuum inducement apparatus 808 and hood 2117 for vacuum evacuation of foam/gas retained in reactor (or reaction) chamber 2127 of electrocoagulation unit 805. Height adjustable vacuum nozzle device 2601 is located in flotation chamber 2119 and is mounted through vacuum hood 2117 (preferably made of clear LEXAN). Nozzle device 2601 is provided with vacuum suction from either a vacuum pump or venturi arrangement. Suction inline cyclone unit 2155 separates the major portion of the wet surface foam from the gas phase.

Nozzle device 2601 includes nozzle body 2603 and a rotatable inlet port shroud 2605 mounted at the end of body 2603. Vacuum stem pipe 2607 has a length selected to position nozzle body 2603 below or partly below fluid level. Shroud 2605 is adjustable so that foam intake slots 2609 at the outer circumference of shroud 2605 are located in the foam layer and above the fluid level thus avoiding vacuum intake of fluid while allowing evacuation of the foam layer between the electrode plate and the area with primary chamber 2127.

Adjustable vacuum relief valve 2610 is set appropriately to avoid damage to the unit. A suction line includes adjustable valve 2153 to trim the level in float 2150 and collected foam is sent to cyclone unit 2155 though port 2611. Vacuum level is controlled at adjustment valve 2613. Excess air from aeration processing at membrane aeration apparatus 803 is received though port 2615.

Air (from ionized air/gas generation apparatus 804 and/or membrane aeration apparatus 803) dissolved into the fluid entering unit 805 diminishes the solids carrying capacity of fluid in unit 805, thus expediting the precipitation of solids from the fluid and enhancing foam creation floating the lighter solids and oils to the surface for evacuation.

As may be appreciated from the foregoing, apparatus and methods for integrated vacuum evacuation of waste foam/gas from an electrocoagulation unit are provided. The apparatus and methods help reduce maintenance and plant investment costs and plant installation space requirements, and provide stable and durable operation with minimal monitoring to avoid accidental overflows and/or contamination.

What is claimed is:

1. An integrated electrocoagulation and waste foam/gas evacuation apparatus for treatment of effluents comprising:
   a primary electrocoagulation reaction chamber for maintaining electrodes therein and having in effluent inlet and outlet;
   an integrated flotation chamber above said reaction chamber;
   a vacuum hood affixed over said flotation chamber; and
   a vacuum nozzle device connectable with a vacuum source and received through said hood and in said flotation chamber and including a height adjustable foam intake and an output, said height adjustable foam intake of said vacuum nozzle device including a nozzle body and a rotatable shroud having at least a first foam intake port.

2. The apparatus of claim 1 wherein said at least a first foam intake port of said shroud is defined at an outer circumference thereof.

3. The apparatus of claim 1 wherein at least a second foam intake port is located opposite said first foam intake port at said shroud.

4. The apparatus of claim 3 wherein said ports are configured as elongated slots.

5. The apparatus of claim 1 further comprising a suction in-line cyclone unit connected with said output of said vacuum nozzle device for receipt of foam/gas and separation of wet foam from the gas phase.

6. The apparatus of claim 1 wherein said vacuum nozzle device includes a stem pipe connected with said nozzle body, said stem pipe of a length selected to position said nozzle body below or partly below fluid level at said chambers.

7. The apparatus of claim 1 wherein said vacuum nozzle device includes a vacuum level adjustment valve.

8. The apparatus of claim 1 further comprising head height and foam/gas level controls at said flotation chamber.

9. The apparatus of claim 1 wherein said nozzle body has said intake thereat positionable so that said nozzle body is below or partly below fluid level at said flotation chamber and said intake is adjustably positionable in a foam layer just above the fluid level for removal of foam and gas through said intake.

10. The apparatus of claim 9 further comprising fluid head height and foam level control mechanism at said flotation chamber for adjusting head height and foam layer level at said flotation chamber.

11. The apparatus of claim 9 further comprising a unit for receiving removed foam/gas from said intake and separating wet foam from gas phase.

12. The apparatus of claim 9 further comprising a control valve for adjusting vacuum level applied to said nozzle device by said vacuum source.

13. Currently Amended) The apparatus of claim 9 wherein said nozzle device includes a plurality of intake ports at said shroud.

14. A vacuum device for evacuation of waste foam/gas from a primary electrocoagulation reactor chamber of an effluent treatment electrocoagulation unit having a housing, said vacuum device comprising:
   a flotation area defined above the primary electrocoagulation reactor chamber;
   a vacuum hood adapted for mounting on the housing and over said flotation area at the primary electrocoagulation reactor chamber; and
   a vacuum nozzle device connectable with a vacuum source and received through said hood and in said flotation chamber and including a height adjustable foam intake, said height adjustable foam intake of said vacuum nozzle device including a nozzle body and a rotatable shroud having at least a first foam intake port, adjustment of said shroud on said body controlling height of said intake port.

15. The apparatus of claim 14 further comprising head height and foam/gas level controls at the top of the reactor chamber.

16. The apparatus of claim 14 wherein said vacuum nozzle device includes a stem pipe connected with said nozzle body, said stem pipe of a length selected to position said nozzle body below or partly below fluid level at the chamber.

17. The apparatus of claim 14 wherein at least a second foam intake port is located opposite said first foam intake port at said shroud.

18. The apparatus of claim 17 wherein said shroud is rotatable on said nozzle body and wherein said intake ports are configured as elongated slots.

* * * * *